(12) United States Patent
Peng et al.

(10) Patent No.: US 11,096,476 B2
(45) Date of Patent: Aug. 24, 2021

(54) PERSONAL CARE APPLIANCE WITH SELF-ADAPTIVE AMPLITUDE REGULATION VIA ACTUATOR NON-LINEARITY AND ACTIVE DRIVING ADJUSTMENT AND METHOD THEREOF

(71) Applicant: KONINKLIJKE PHILIPS N.V., Eindhoven (NL)

(72) Inventors: Meng Peng, Bothell, WA (US); Scott Robert Wills, Shoreline, WA (US); Sungsoo Lee, Kirkland, WA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 357 days.

(21) Appl. No.: 15/564,220

(22) PCT Filed: Apr. 6, 2016

(86) PCT No.: PCT/IB2016/051939
§ 371 (c)(1),
(2) Date: Oct. 4, 2017

(87) PCT Pub. No.: WO2016/162798
PCT Pub. Date: Oct. 13, 2016

(65) Prior Publication Data
US 2018/0125224 A1 May 10, 2018

Related U.S. Application Data

(60) Provisional application No. 62/143,369, filed on Apr. 6, 2015.

(51) Int. Cl.
*A46B 15/00* (2006.01)
*A61C 17/22* (2006.01)
(Continued)

(52) U.S. Cl.
CPC ...... *A46B 15/0006* (2013.01); *A46B 15/0004* (2013.01); *A61C 17/221* (2013.01); *A61C 17/32* (2013.01); *H03K 17/94* (2013.01)

(58) Field of Classification Search
CPC .... A46B 15/0006; A61C 17/32; A61C 17/221
See application file for complete search history.

(56) References Cited

U.S. PATENT DOCUMENTS

| 5,955,799 A | 9/1999 | Amaya et al. |
| 8,341,791 B2 | 1/2013 | Iwahori |

(Continued)

FOREIGN PATENT DOCUMENTS

WO 2007072365 A1 6/2007

*Primary Examiner* — Kawing Chan
*Assistant Examiner* — Bradley R Brown (57) ABSTRACT

A personal care appliance 10 comprises an actuator 14, a current sensor 28 for monitoring a driving current, and a controller 24. The actuator 14, operable according to a non-linear response characteristic 58 of amplitude versus frequency, includes a movable shaft 18 configured for resonant movement 38 in response to a drive signal 25, further for being coupled with a workpiece 20. The controller 24 (i) detects at least one of a plurality of different characteristic load states (100,102,104,106,108,110) in response to a perturbation in the monitored driving current 29 and (ii) actively delivers the drive signal 25 to the actuator 14 selected from at least two different drive signals (66,70) as a function of a detected characteristic load state. In this manner, the controller 24 implements self-adaptive amplitude regulation of the movable shaft's resonant movement 38 among the plurality of difference characteristic load states that include additional loads of force, spring, mass, and/or damping to a given load state of a resonant spring mass system of actuator 14 coupled with workpiece 20.

12 Claims, 9 Drawing Sheets

(51) Int. Cl.
 *A61C 17/32* (2006.01)
 *H03K 17/94* (2006.01)

(56) References Cited

U.S. PATENT DOCUMENTS

| | | |
|---|---|---|
| 2007/0050982 A1 | 3/2007 | Freund et al. |
| 2007/0157404 A1 | 7/2007 | Brewer et al. |
| 2009/0025156 A1* | 1/2009 | Asada ................ A61C 17/3481 15/22.1 |
| 2011/0005015 A1* | 1/2011 | Iwahori .............. A61C 17/3481 15/22.1 |
| 2011/0100501 A1 | 1/2011 | Iwahori et al. |
| 2012/0246846 A1 | 10/2012 | Hall |
| 2013/0025078 A1* | 1/2013 | Heil ................... A61C 17/3436 15/22.1 |
| 2014/0259472 A1 | 9/2014 | Bovenkamp et al. |

\* cited by examiner

PERSONAL CARE APPLIANCE WITH SELF-ADAPTIVE AMPLITUDE REGULATION VIA ACTUATOR NON-LINEARITY AND ACTIVE DRIVING ADJUSTMENT AND METHOD THEREOF

CROSS-REFERENCE TO PRIOR APPLICATIONS

This application is the U.S. National Phase application under 35 U.S.C. § 371 of International Application No. PCT/IB2016/051939, filed on Apr. 6, 2016, which claims the benefit of U.S. Provisional Patent Application No. 62/143,369, filed on Apr. 6, 2015. These applications are hereby incorporated by reference herein.

The present embodiments relate generally to personal care appliances and more particularly, to a personal care appliance with self-adaptive amplitude regulations via actuator non-linearity and active driving adjustment and a method thereof.

Resonant, high frequency, electronic toothbrushes are commonly used by consumers. One known detractor for some consumers is that these devices can generate a mess during use if they pull the device out of their mouth while it is operating (e.g. saliva and toothpaste splatter). This issue is quickly overcome as the consumer becomes familiar with the toothbrush; however, the experience of splattering materials about the bathroom affects their initial impressions of the toothbrush and can contribute to their decision not to use this product as part of their regular oral healthcare routine. Hence, it is desirable to have a toothbrush that will reduce the likelihood and extent of splatter if a consumer should operate the device out of the mouth.

A toothbrush with automatic actuation, as disclosed in US 20120246846 A1, has identified a solution for avoiding mess. The toothbrush with automatic actuation uses capacitive sensors in an arrangement to allow for an automatic activation of the device when inserted into the mouth. In the known toothbrush, the capacitive sensors act as an ON/OFF switch, precluding the need for a power button. However, the precluding of a power button via use of capacitive sensors in the known toothbrush does not take advantage of any non-linear response to deliver a different amplitude in-mouth versus that outside of the mouth, further in view of the fact that the toothbrush is powered OFF once outside the mouth.

Consumers, especially those accustomed to using manual toothbrushes, typically experience a familiarization period when they use an electronic toothbrush for the first time. For many of these consumers, the mess generated by the operation of the electronic toothbrush (e.g. splatter) can be a disadvantage of using a high-frequency resonant electronic toothbrush. In addition, such an experience may reduce the likelihood that they will use this device as part of their regular brushing routine and/or may contribute to a decision not to use the electronic toothbrush at all.

Accordingly, an improved method and apparatus for overcoming the problems in the art is desired.

In accordance with one aspect of the present disclosure, a personal care appliance comprises a resonant electronic toothbrush with non-linear amplitude/frequency response characteristics and self-adaptive amplitude regulation. The personal care appliance automatically reduces power upon removal from the mouth and automatically increases power when operating inside the mouth. Automatically reducing power advantageously reduces the amount of material splatter that can occur if operated outside of the mouth, in contrast to full power. The resonant electronic toothbrush also automatically increases power to achieve a desired cleaning efficacy in response to operating inside of the mouth, i.e., at full power. Accordingly, the embodiments advantageously improve consumer experience.

In accordance with another aspect, the personal care appliance comprises an electronic toothbrush that overcomes the disadvantages of the known toothbrush with automatic actuation, as discussed herein above, wherein the known toothbrush precluded the need for a power button via use of capacitive sensors. In contrast, with respect to an electronic toothbrush, the embodiments of the present disclosure are powered ON during usage and take advantage of the toothbrush motor's non-linear response characteristics to deliver a different amplitude in-mouth versus that outside of the mouth.

Further according to another aspect of the present disclosure, the electronic toothbrush is configured to operate in a manner such that power is significantly reduced when it is used outside of the mouth, which advantageously prevents or greatly reduces the issue of splatter and allows for an improved first impression experience for consumers, especially for those consumers unfamiliar with the use of high frequency resonant toothbrushes.

According to one aspect, a personal care appliance operable with self-adaptive amplitude regulation among a plurality of different characteristic load states comprises an actuator, a current sensor, and a controller. The actuator includes a movable shaft configured for resonant movement in response to a drive signal and for being coupled with a workpiece, such as a brush head. The actuator is further operable according to a non-linear response characteristic of movement amplitude versus frequency. The controller is coupled to the actuator via the current sensor which is configured for monitoring a driving current. The controller is configured to (i) detect at least one of a plurality of different characteristic load states in response to a perturbation in the monitored driving current and (ii) actively deliver the drive signal to the actuator. The actively delivered drive signal is selected from at least two different drive signals as a function of a detected characteristic load state of the plurality of different characteristic load states for implementing self-adaptive amplitude regulation of the movable shaft's resonant movement among the plurality of difference characteristic load states. The plurality of difference characteristic load states include one or more additional loads of force, spring, mass, and damping to a given load state of a resonant spring mass system of the actuator coupled with the workpiece.

According to another aspect, the resonant movement comprises at least one of a rotational resonant movement and a translational resonant movement. In one embodiment, the rotational resonant movement includes (i) a first rotational angular amplitude in a range of 4 degrees or less and (ii) a second rotational angular amplitude in a range of 8 to 12 degrees.

According to another aspect, each drive signal comprises a square wave having a frequency and a duty cycle. In one embodiment, the controller (i) actively delivers a first drive signal to the actuator in response to a detection of a characteristic load state corresponding to an out-of-mouth state, (ii) actively delivers a second drive signal to the actuator in response to a detection of a characteristic load state corresponding to one or more of (ii)(a) an initial contact with mouth state, (ii)(b) a shift in-mouth state, in which an amplitude of the moveable shaft's resonant movement autonomously increases to full power amplitude at an operating frequency of the second drive signal via use of non-linear response characteristics of the actuator, (ii)(c) a damped in-mouth state, and (ii)(d) a leave mouth state, and (iii) actively delivers the first drive signal to the actuator in response to a return detection of the characteristic load state corresponding to the out-of-mouth state.

In one embodiment, the frequency of the first drive signal includes a rest frequency and the frequency of the second drive signal includes an operating frequency, wherein the rest frequency is different from the operating frequency. In another embodiment, the rest frequency comprises a frequency at which a highest current sensitivity in the response characteristic of the actuator occurs. In a further embodiment, the operating frequency comprises a frequency in the range of 200-300 Hz, suitable for obtaining a desired cleaning efficacy and efficiency with the workpiece.

According to another embodiment, the square wave of the first drive signal includes a first duty cycle and the square wave of the second drive signal includes a second duty cycle, different from the first duty cycle. For example, the first duty cycle can be in a range of 10:90 to 30:70, corresponding to a range of 10-30 percent ON and a range of 90-70 percent OFF, respectively, for each of a positive polarity portion and a negative polarity portion of the first drive signal. In addition, the second duty cycle can be in a range of 90:10 to 70:30, corresponding to a range of 90-70 percent ON and a range of 10-30 percent OFF, respectively, for each of a positive polarity portion and a negative polarity portion of the second drive signal.

According to yet another embodiment, a method of self-adaptive amplitude regulation among a plurality of different characteristic load states with a personal care appliance comprises providing an actuator having a movable shaft configured for resonant movement in response to a drive signal and for being coupled with a workpiece. The actuator is operable according to a non-linear response characteristic of movement amplitude versus frequency. The resonant movement comprises at least one of a rotational resonant movement and a translational resonant movement. In addition, the method comprises monitoring, via a current sensor, a driving current of the drive signal to the actuator and detecting, via a controller coupled to the actuator and the current sensor, at least one of the plurality of different characteristic load states in response to a perturbation in the monitored driving current. The method further comprises actively delivering, via the controller, the drive signal to the actuator selected from at least two different drive signals as a function of a detected characteristic load state of the plurality of different characteristic load states for implementing self-adaptive amplitude regulation of the movable shaft's resonant movement among the plurality of difference characteristic load states.

Still further advantages and benefits will become apparent to those of ordinary skill in the art upon reading and understanding the following detailed description.

The embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

As disclosed herein, the embodiments of the present disclosure rely upon the use of a resonant system that has significant non-linear behavior in its unloaded amplitude/frequency response and that also adopts more linear characteristics in the presence of a load (i.e., force, mass, damping, and spring). In one embodiment, upon application of a load, the personal care appliance (e.g., an electronic toothbrush) is controlled to operate at an operating frequency slightly lower than a rest frequency at which the non-linearity exists (low amplitude) in the unloaded condition. Further responsive to the application of loading, the frequency amplitude characteristics of the resonant system (e.g., the actuator) will change by self-adaptive amplitude regulation, resulting in an amplitude increase, thereby making use of the non-linear response characteristics of the resonant system. Upon removal of the load, the personal care appliance is actively driven or controlled to return to the previous unloaded condition at the rest frequency and the amplitude will reduce significantly.

Figure 1:
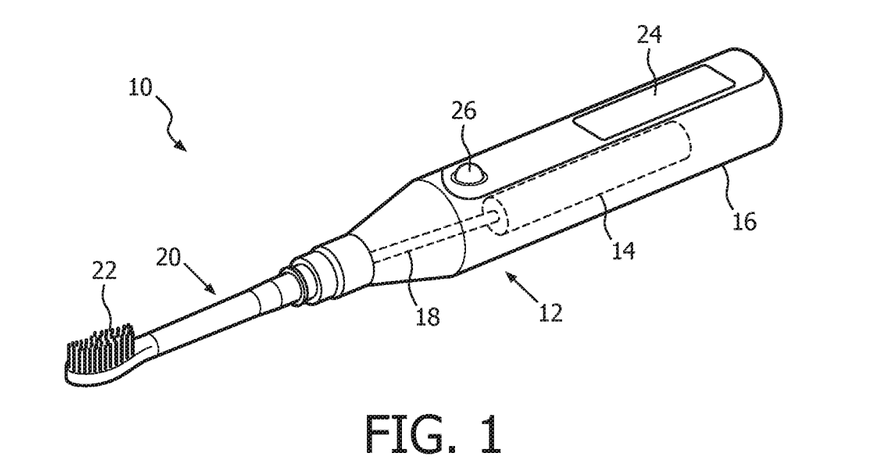
FIG. 1 is a perspective view of a personal care appliance with self-adaptive amplitude regulation via actuator non-linearity and active driving adjustment according to an embodiment of the present disclosure.

With reference now to FIG. 1, a perspective view of a personal care appliance 10 with self-adaptive amplitude regulation via actuator non-linearity and active driving adjustment according to an embodiment of the present disclosure is illustrated. The personal care appliance 10 comprises a drive system, generally indicated by reference numeral 12, including an actuator 14. In one embodiment, the personal care appliance 10 comprises a resonant electronic toothbrush. The actuator 14 is generally disposed within a handle 16 of the personal care appliance 10. The actuator 14 uses resonant magnetic action to drive an output mounting shaft 18 on which is mounted a workpiece 20, for example, a brushhead with bristles 22 for the electronic toothbrush. The personal care appliance further comprises a controller 24 and a means 26 for turning the appliance ON and/or OFF, for example, via an actual or virtual switch or other suitable ON/OFF mechanism for a given appliance implementation. In one mode of operation, responsive to activating the appliance ON via means 26, controller 24 outputs an appropriate drive signal to actuator 14, as will be discussed further herein.

Figure 2:
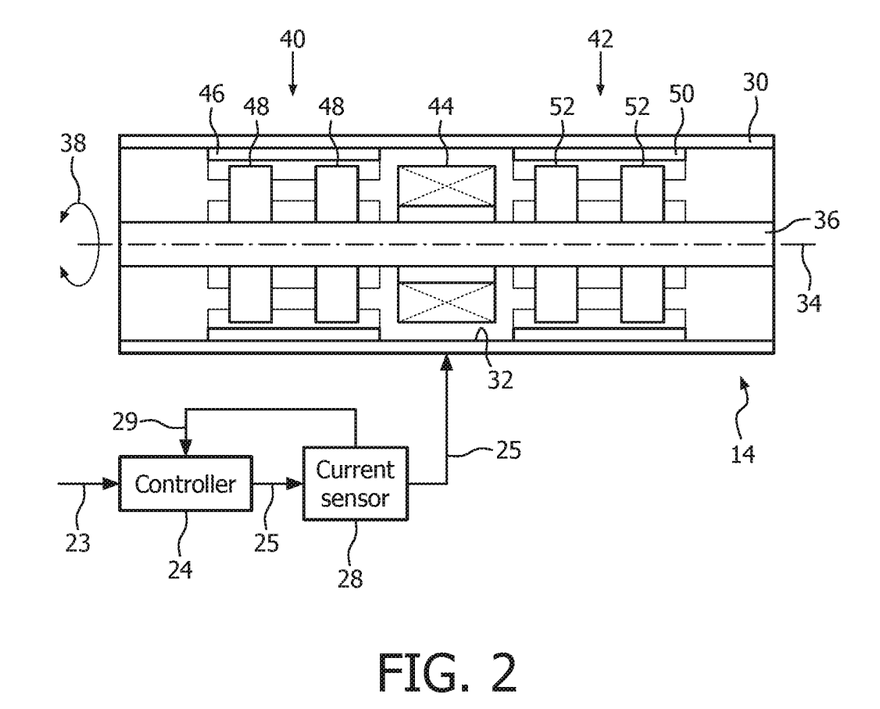
FIG. 2 is a schematic view of an actuator in cross-section, a controller, and a current sensor of the personal care appliance according to an embodiment of the present disclosure.

Turning now to FIG. 2, there is shown a schematic view of the actuator 14 in cross-section, controller 24, and a current sensor 28 of the personal care appliance 10 according to an embodiment of the present disclosure. Controller 24 can include one or more suitable microprocessors, microcontrollers, or other type of control device. In one embodiment, controller 24 is configured for providing a rotation drive signal, via signal line(s) 25, to the actuator 14, according to the particular requirements of a given personal care appliance implementation. For example, the rotation drive signals can be configured to provide multiple different actuator motions and/or operational modes for the personal care appliance 10, as will be discussed further herein. Controller 24 can also receive an ON/OFF signal or any other suitable activation signal, for example, via input signal line 23.

Referring still to FIG. 2, current sensor 28 is coupled between a drive signal output of controller 24 and a drive signal input of actuator 14. Current sensor 28 comprises any suitable sensor or component for use in monitoring a driving current of the drive signal output via the controller 24 and input to the actuator 14. The driving current detected by current sensor 28 is fed back, for example, via signal line 29 to the controller 24 for monitoring driving current perturbations, as will be discussed further herein.

With reference still to FIG. 2, in one embodiment, actuator 14 comprises a cylindrical housing 30 of magnetic material having an inner radial surface 32 and a principal axis 34 extending longitudinally along a length dimension thereof. The actuator further comprises a spindle 36 of magnetizable material extending longitudinally within the housing 30 along the principal axis 34. Spindle 36 is mechanically coupled, via bearings or other suitable means known in the art (not shown), with respect to the housing 30. As a result, spindle 36 can exhibit rotational motion 38 of the spindle with respect to the housing 30, which is transferred to output mounting shaft 18, via any suitable coupling with spindle 36. As will be discussed further herein, the motion 38 of spindle 36, and thus motion of shaft 18, is controlled in a manner that comprises a resonant movement.

Figure 3:
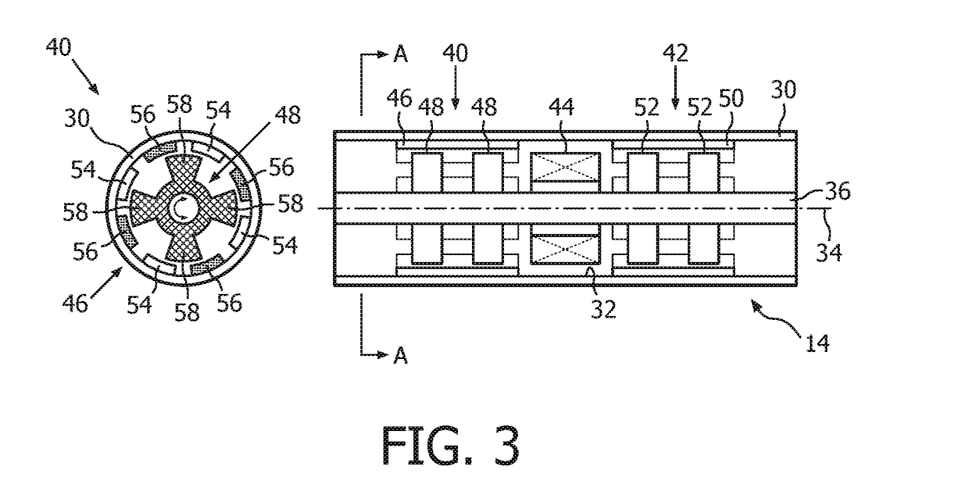
FIG. 3 is a cross-sectional view of a magnet and pole assembly of an actuator, including a sectional view along A-A, of the personal care appliance according to an embodiment of the present disclosure.

With reference to now to both FIG. 2 and FIG. 3, the tangential actuator 14 comprises (i) a first permanent magnet and pole assembly 40, (ii) a second permanent magnet and pole assembly 42 and (iii) an electromagnetic coil 44 (or electromagnetic coil winding). First permanent magnet and pole assembly 40 can comprise a first magnet assembly 46 and a first pole assembly 48, which can include more than one pole assembly (e.g., two pole assemblies are shown). Similarly, second permanent magnet and pole assembly 42 can comprise a second magnet assembly 50 and a second pole assembly 52, which can include more than one pole assembly (e.g., two pole assemblies are shown). The electromagnetic coil 44 (or electromagnetic coil winding) is disposed about and coupled to the spindle 36 in-between the first and second magnet and pole assemblies, 40 and 42, respectively.

With reference now to FIG. 3, a cross-sectional view of a magnet and pole assembly 40 of a portion of actuator 14, taken along A-A, is shown. As illustrated, the permanent magnet and pole assembly 40 includes a plurality of N-polarity and S-polarity magnets indicated by reference numerals 54 and 56, respectively and having a first polarity order. In one embodiment, the plurality of N-polarity and S-polarity magnets comprises eight (8) magnets of equal dimension, and equally spaced apart (i.e., an equi-gapped N magnet and S magnet arrangement), about the inner radial surface 32 of housing 30. Each N-polarity magnet 54 and S-polarity magnet 56 is further longitudinally disposed on the inner radial surface 32 of the housing 30, that is, directed perpendicularly into the page of the drawing figure. The magnet and pole assembly 40 further includes a pole assembly 48 having four (4) pole members, indicated by reference numeral 58, of equal dimension and equally spaced apart in a radial configuration disposed about spindle 36. In this configuration, the tangential actuator 14 has an effective cogging position that provides a tangential actuator response characteristic. Other configurations of tangential actuator 14 are also possible, according to the requirements of a given personal care appliance implementation.

The second permanent magnet and pole assembly 42 of the actuator portion 14 is similar to that of the first permanent magnet and pole assembly 40 with the following differences. The second permanent magnet and pole assembly 42 comprises a second plurality 50 of S-polarity and N-polarity magnets and having a second polarity order, opposite to the first polarity order. In addition, each individual magnet segment of the second plurality is longitudinally disposed along the inner radial surface of the housing 30. The second permanent magnet and pole assembly 42 of the actuator 14 further comprises a second pole assembly 52 having a second set of pole members, similar to those of the first pole assembly 48, arranged in a radial configuration disposed about the spindle 36.

Responsive to a rotation drive control signal applied to the electromagnetic coil 44 via the controller 24 (FIG. 2), the actuator 14 rotationally displaces the spindle 36 with respect to the housing 30 about the principal axis 34, and thus imparts a desired rotational motion 38 to spindle 34. The desired rotational motion can comprise, for example, rotational motion having a peak-to-peak amplitude with a range of 8-12°, or other range, as appropriate for a given personal care appliance implementation, as will be discussed further herein.

Figure 4:
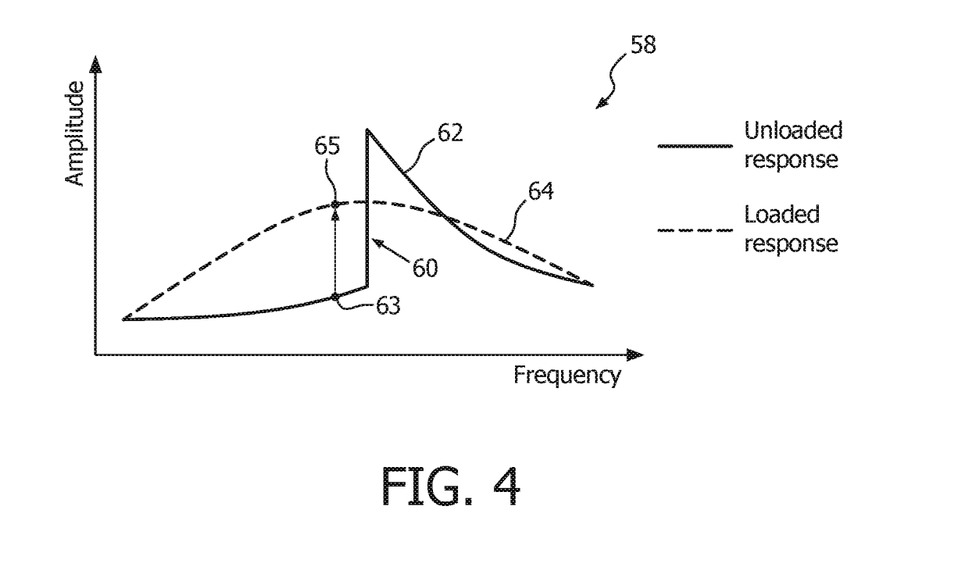
FIG. 4 is an amplitude/frequency response characteristic of the actuator of FIG. 1, illustrating a non-linearity in amplitude of the frequency response curve for an unloaded response and illustrating a change in shape of the frequency response curve in the presence of an applied load (i.e., loaded response) according to an embodiment of the present disclosure.

With reference now to FIG. 4, there is shown a frequency response characteristic 58 for a resonant spring mass system, for example, actuator 14 (FIGS. 1-3). In particular, the resonant spring mass system is configured such that the system exhibits a significant non-linear behavior when it is operated in an unloaded condition. This can be achieved through the use of a non-linear spring. For this type of resonant spring mass system, there will be a large increase in amplitude over a small change in frequency. The large increase in amplitude over a small change in frequency is referred to as the "non-linearity" 60 of the "Unloaded Response" curve 62 in FIG. 4. In addition, for this resonant spring mass system, the shape of the frequency response curve 62 will change in the presence of an applied load, i.e., similar to that which is found in-mouth. The change in the presence of an applied load is reflected in the "Loaded Response" curve 64 in FIG. 4. According to one embodiment, the inventors have discovered that operation of this system at a frequency slightly below the "non-linearity" 60 will result in an electronic toothbrush that will operate at a low amplitude 63 unloaded (i.e., brushhead 20 outside of the mouth) and at a much higher amplitude 65 while loaded (i.e., brushhead 20 inside of the mouth).

Furthermore, the inventors have found that the driving current for a resonant spring mass system of a personal care appliance closely relates to amplitude of the resonant spring mass system. The driving current is monitored, e.g., via current sensor 28 (FIG. 2) to detect amplitude variations or perturbations. In the context of an electronic toothbrush with the resonant spring mass system, when the amplitude of the resonant spring mass system is decreasing quickly, it is recognized as an out-of-mouth situation and the controller 24 for the electronic toothbrush reduces the drive power to further lower brushhead motion. The further lowering of the brushhead motion, for the out-of-mouth situation, advantageously prevents fluids that are present on brushhead 20 from splashing or splattering. Moreover, the operating frequency will be shifted, via the controller 24, to the value where the drive current has highest sensitivity to amplitude variations, also referred to herein as the "Rest Frequency". At this state, the toothbrush operates in a stable condition. The amplitude and current change from stable to unstable when the brushhead 20 is put back into the mouth. Upon capturing the corresponding perturbation, the drive frequency and power are set back to the normal operating values, via the controller 24, to achieve the desired in-mouth amplitude for clean efficacy. This will be become further understood with reference to the FIGS. 5-12 which relate to a plurality of different characteristic load states (100,102, 104,106,108,110).

The plurality of different characteristic load states include one or more additional loads of force, spring, mass, and damping to a given load state of a resonant spring mass system of the actuator (14) coupled with the workpiece (20). Note that different types of loading conditions contribute to which of the additional loads of force, spring, mass, and damping are applied to and influence the given load state. Self-adaptive amplitude regulation of the movable shaft's resonant movement (38) is implemented among the plurality of difference characteristic load states as explained in the corresponding descriptions provided herein below.

As indicated herein above, controller 24 is configured for providing a rotation drive signal, via signal line(s) 25, to the actuator 14, according to the particular requirements of a given personal care appliance implementation. For example, the rotation drive signals can be configured to provide multiple different actuator motions and/or operational modes for the personal care appliance 10. In one embodiment, each drive signal comprises a square wave having a frequency and a duty cycle. As will be discussed further herein below, the controller (i) actively delivers a first drive signal to the actuator in response to a detection of a characteristic load state corresponding to an out-of-mouth state, (ii) actively delivers a second drive signal to the actuator in response to a detection of a characteristic load state corresponding to one or more of (ii)(a) an initial contact with mouth state, (ii)(b) a shift in-mouth state, (ii)(c) a damped in-mouth state, and (ii)(d) a leave mouth state, and (iii) actively delivers the first drive signal to the actuator in response to a return detection of the characteristic load state corresponding to the out-of-mouth state.

In one embodiment, each drive signal comprises a square wave having a frequency and a duty cycle. The frequency of the first drive signal includes a rest frequency and the frequency of the second drive signal includes an operating frequency. The rest frequency may be different from the operating frequency. In one embodiment, the rest frequency can be on the order of 20 Hz different from the operating frequency (e.g., 20 Hz greater than, or less than), according to the requirements of a given personal care appliance implementation. In addition, the rest frequency comprises a frequency where a highest current sensitivity in the response characteristic of the actuator occurs. Furthermore, the square wave of the first drive signal includes a first duty cycle and the square wave of the second drive signal includes a second duty cycle, different from the first duty cycle.

Figure 5:
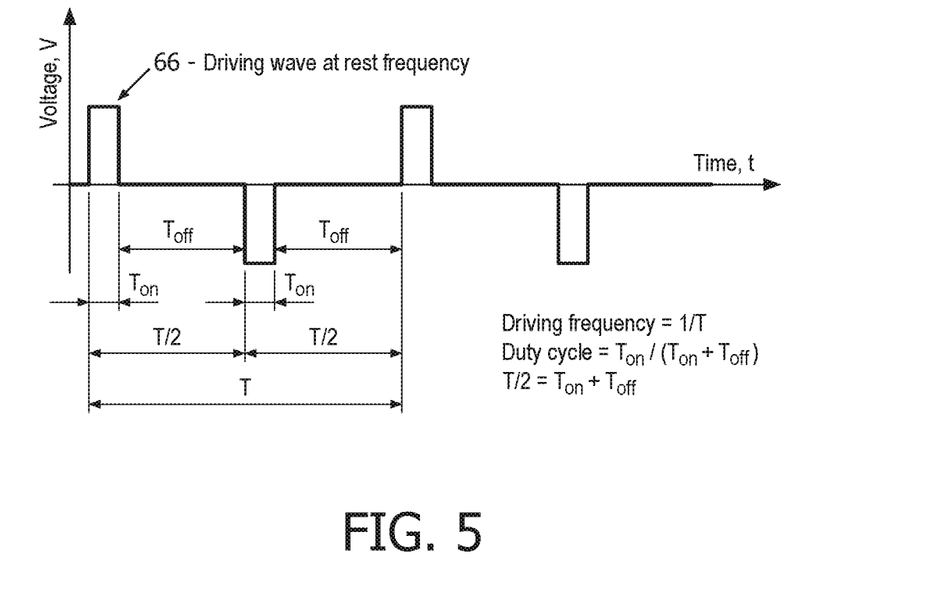
FIG. 5 is a plot of voltage versus time of a driving wave at a rest frequency as output via a controller of the personal care appliance according to an embodiment of the present disclosure.

FIG. 5 is a plot of voltage versus time of a driving wave 66 (i.e., the first drive signal) at a rest frequency as output via a controller 24 of the personal care appliance 10 according to an embodiment of the present disclosure. One example of the rest frequency is identified by reference numeral 68 in FIGS. 7, 8 and 12. The driving wave 66 at the rest frequency is characterized by a corresponding driving frequency (i.e., 1/T, where T=signal period) and a duty cycle. The duty cycle is represented by the quantity of $T_{on}/(T_{on}+T_{off})$, where $(T_{on}+T_{off})=T/2$. In other words, the duty cycle is a percentage ON to a percentage OFF for each of a positive polarity portion and a negative polarity portion of the first drive signal. The duty cycle of the first drive signal can comprise a duty cycle selected according to the requirements of a given personal care appliance implementation, further in connection with low power drive, low power amplitude, and/or low power current as discussed herein. For example, the duty cycle of the first drive signal may include a duty cycle in a range from 10:90 to 30:70, corresponding to a low power drive setting. Other values of duty cycle may also be possible.

Figure 6:
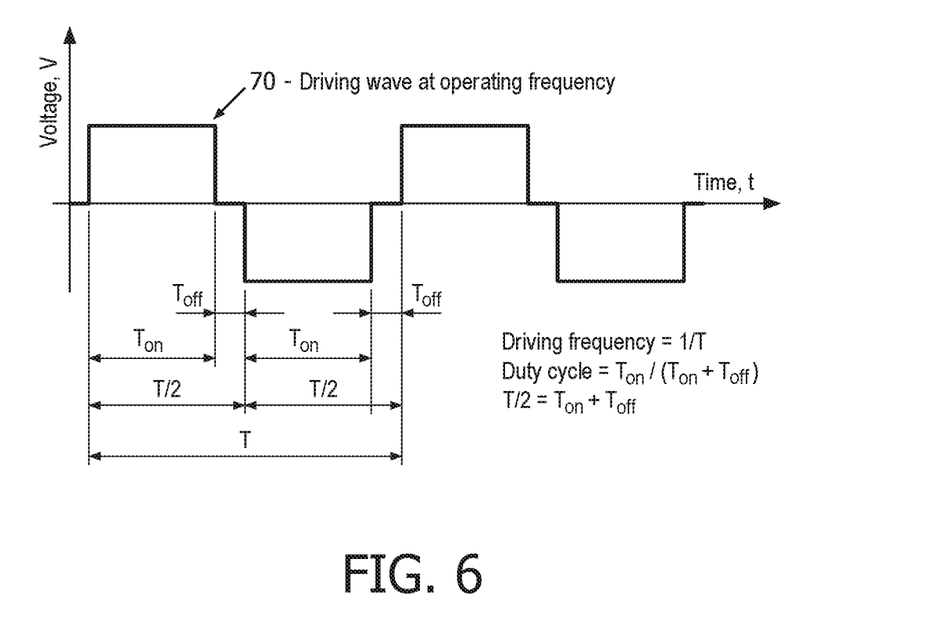
FIG. 6 is a plot of voltage versus time of a driving wave at an operating frequency as output via the controller of the personal care appliance according to an embodiment of the present disclosure.

FIG. 6 is a plot of voltage versus time of a driving wave 70 (i.e., the second drive signal) at an operating frequency as output via the controller 24 of the personal care appliance 10 according to an embodiment of the present disclosure. One example of the operating frequency is identified by reference numeral 72 in FIGS. 8-12. The driving wave 70 at the operating frequency is characterized by a corresponding driving frequency (i.e., 1/T, where T=signal period) and a duty cycle. The duty cycle is represented by the quantity of $T_{on}/(T_{on}+T_{off})$, where $(T_{on}+T_{off})$=T/2. In other words, the duty cycle is a percentage ON to a percentage OFF for each of a positive polarity portion and a negative polarity portion of the second drive signal. The duty cycle of the second drive signal can comprise a duty cycle selected according to the requirements of a given personal care appliance implementation, further in connection with full power drive, full power amplitude, and/or full power current as discussed herein. For example, the duty cycle of the second drive signal can include a duty cycle in a range from 70:30 to 90:10, corresponding to a full power drive setting. Other values of duty cycle may also be possible.

Figure 7:
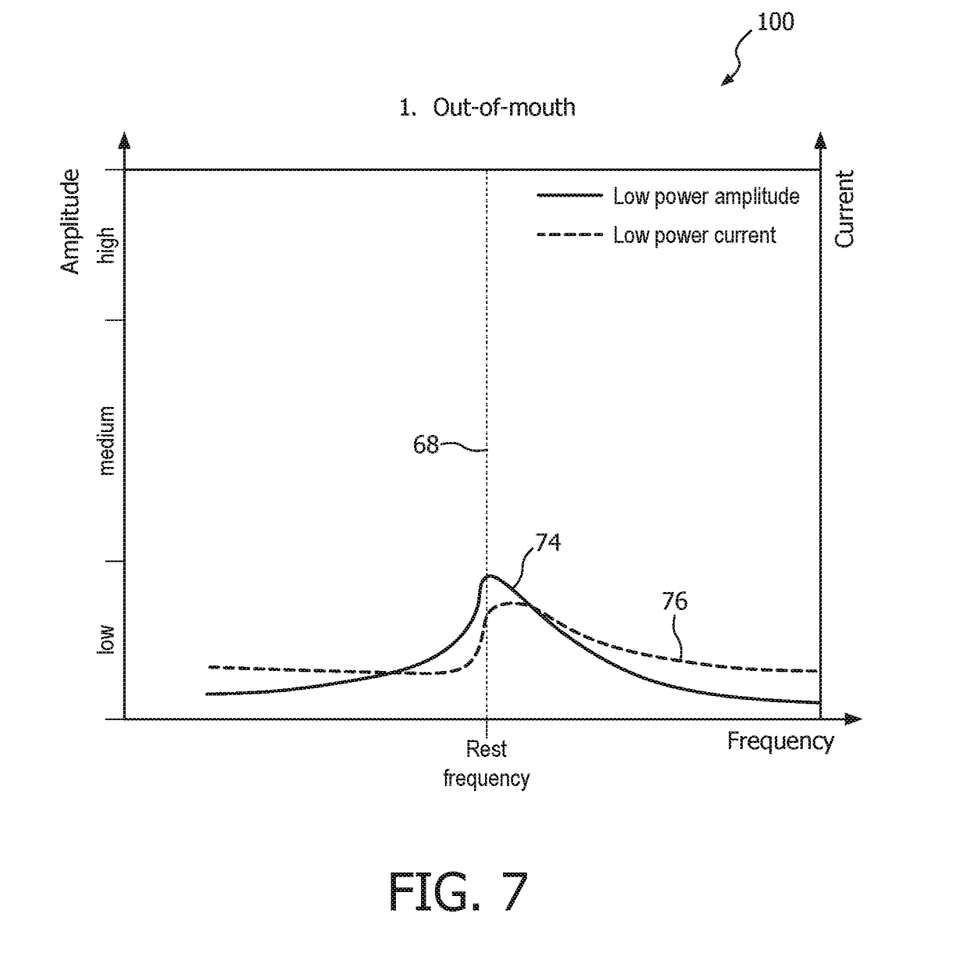
FIGS. 7-12 are amplitude/frequency response characteristic curves for the actuator of FIG. 1, illustrating a plurality of different characteristic load states of the personal care appliance to be detected according to an embodiment of the present disclosure.

With reference now to FIG. 7, characteristic curves for an out-of-mouth state 100 are illustrated. The out-of-mouth state 100 corresponds with a standby state. In the standby state, the controller 24 drives the resonant spring mass system, i.e., actuator 14, with a low drive power. Responsive to the low drive power, the resonant spring mass system stays at low amplitude (i.e., with respect to amplitude of rotational motion 38 of the spindle 36 and brushhead 20). For example, low amplitude may correspond to a rotational angular amplitude in a range of 4 degrees or less. In addition, the controller 24 drives the resonant spring mass system at the frequency corresponding to the "Rest Frequency" 68. As discussed herein, the "Rest Frequency" 68 is the frequency at which the drive current has a largest slope in the amplitude/frequency response curve and the amplitude is low enough to prevent splatter of fluids. In FIG. 7, low power amplitude is indicated by reference numeral 74 and low power current is indicated by reference numeral 76, each with a respective value at the rest frequency 68.

Figure 8:
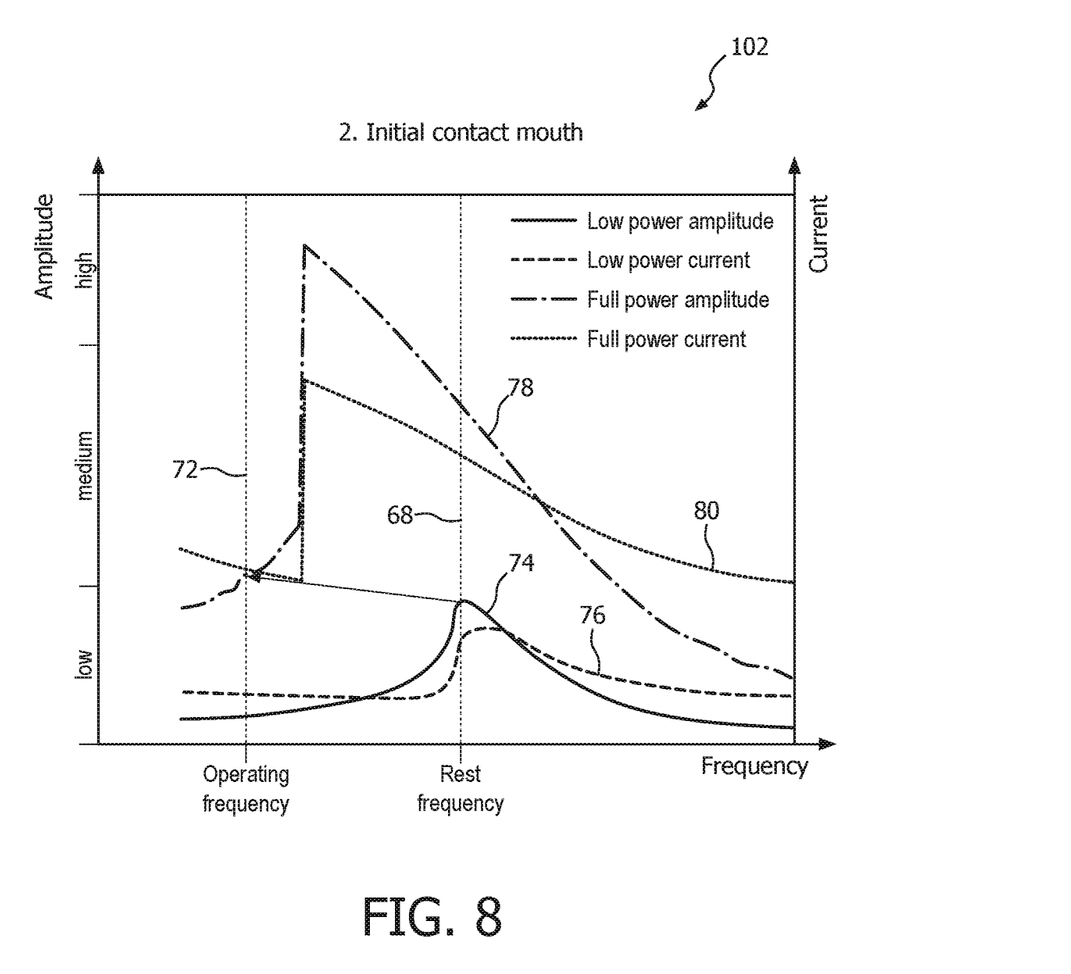

With reference now to FIG. 8, characteristic curves for an initial contact with mouth state 102 are illustrated. The initial contact with mouth state 102 corresponds with a detecting state. While operating unloaded, the value of drive current is quite stable. However, upon putting the brushhead 20 inside of the mouth, the system current curves will shift and/or deform. The perturbation due to initial contact with mouth can be easily detected in current because the rest frequency 68 drives the system where the highest current sensitivity occurs. Responsive to detecting the perturbation, the controller 24 drives the resonant mass spring system (i.e., the actuator 14) from the rest frequency 68 with low drive power to the operating frequency 72 with full drive power. Further responsive to driving the system at the operating frequency with full drive power, the resonant spring mass system transitions from low amplitude to medium amplitude (i.e., with respect to amplitude of rotational motion 38 of the spindle 36 and brushhead 20). For example, medium amplitude may correspond to rotational angular amplitudes in a range of between 4 and 8 degrees. In FIG. 8, full power amplitude is indicated by reference numeral 78 and full power current is indicated by reference numeral 80, each with a respective value at the operating frequency 72.

With reference still to FIG. 8, it should be noted that the curves 74-80 also can be used to convey the effects of using a drive signal with a duty cycle shift and a constant frequency. For example, while maintaining the drive signal at a single frequency (e.g., the rest frequency 68) and low power duty cycle, a low power amplitude 74 and low power current 76 are obtained. Shifting the duty cycle of the drive signal to a full power duty cycle while maintaining the frequency (i.e. at the rest frequency 68) produces full power amplitude 78 and full power current 80, each with a respective value at the rest frequency 68. Accordingly, the embodiments of the present disclosure can include the controller 24 maintaining an actuator drive signal 25 at a single frequency, while modulating the drive signal between a low power duty cycle and a high power duty cycle, as appropriate for the requirements of a given personal care appliance implementation.

Figure 9:
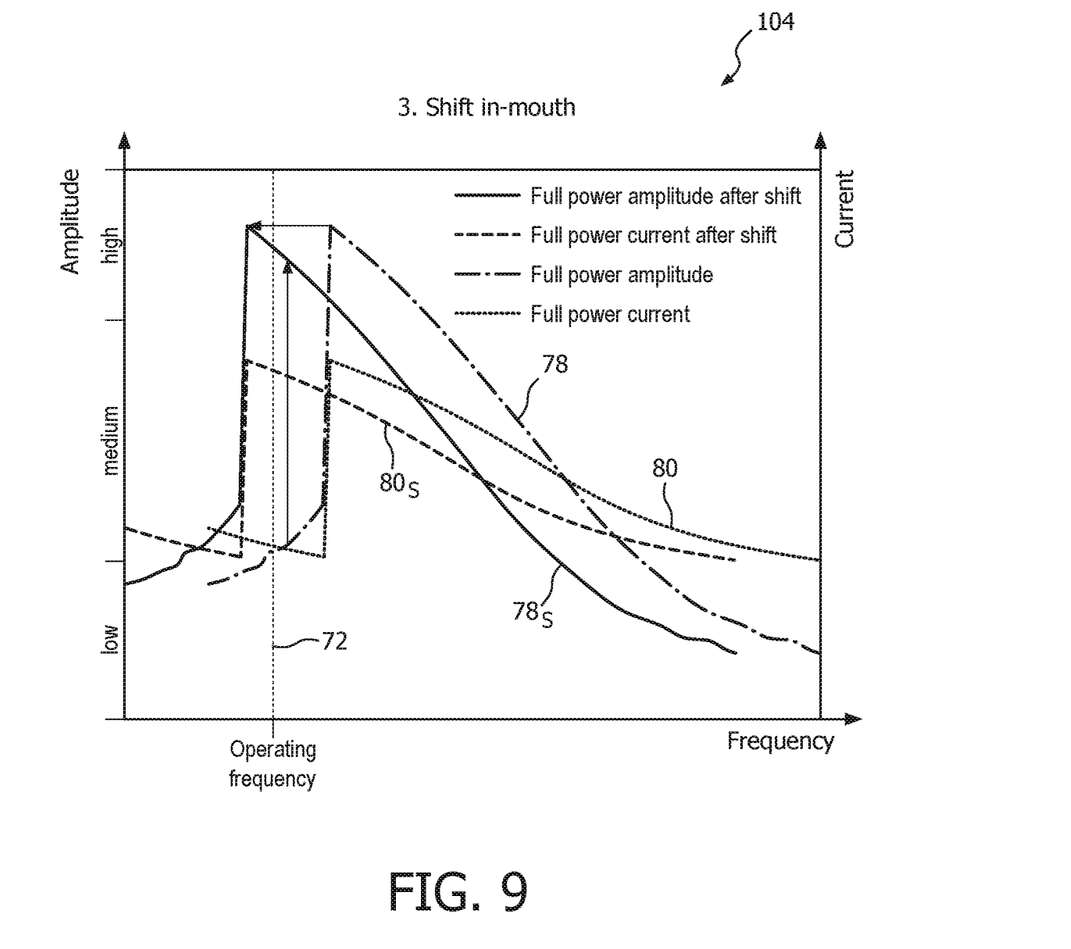

With reference now to FIG. 9, characteristic curves for a shift in-mouth state 104 are illustrated. The shift in-mouth state 104 corresponds with a shift state. The in-mouth environment, e.g., water, saliva, toothpaste, etc., increases the mass of inertia (MOI) of the brushhead 20, which shifts the characteristic curves of the amplitude/frequency response to the left, i.e., in the low frequency direction. While shifting to the left, once the non-linear jump point of the characteristic curves pass the operating frequency 72, the resonant spring mass system (i.e., the actuator 14) transitions by itself, as a function of the non-linear response characteristics of the resonant spring mass system (i.e., the actuator 14), from medium amplitude to high amplitude (i.e., with respect to amplitude of rotational motion 38 of the spindle 36 and brushhead 20). For example, high amplitude may correspond to rotational angular amplitudes in a range greater than 12 degrees. In other words, as shown, the characteristic curves for full power amplitude 78 and full power current 80 occur in response to the initial contact with mouth state. In the shift state, these characteristic curves transition, by making use of the non-linear response characteristics of the resonant spring mass system, to the curves for full power amplitude after shift, indicated by reference numeral $78_S$, and full power current after shift, indicated by reference numeral $80_S$, respectively, as illustrated in FIG. 9, each with a respective value at the operating frequency 72.

With reference still to FIG. 9, it should be noted that a system shift, resulting predominantly from the addition of more mass of inertia (MOI), could affect a performance of the personal care appliance without an adjustment of duty cycle and/or operating frequency. In other words, as more MOI is added to the load characteristic of the given load state, the curves for full power amplitude after shift, indicated by reference numeral $78_S$, and full power current after shift, indicated by reference numeral $80_S$, continue to shift in the low frequency direction to a given extent. As a result, each curve has a respective value at the operating frequency 72 which decreases to a limited extent as shifting increases in the low frequency direction.

Figure 10:
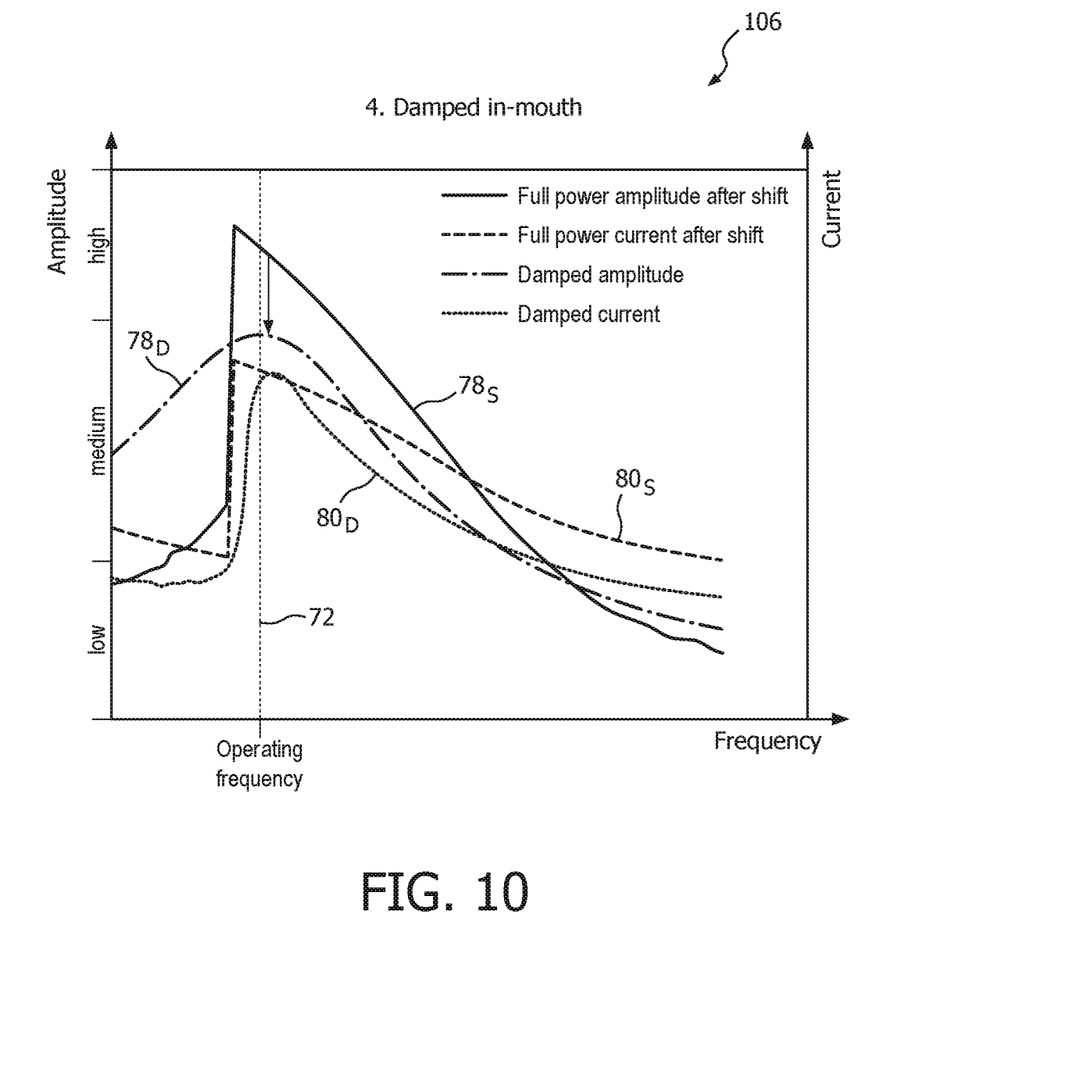

With reference now to FIG. 10, characteristic curves for a damped in-mouth state 106 are illustrated. The damped in-mouth state 106 corresponds with a damped state. While the brushhead 20 is in the mouth, the in-mouth fluids and soft tissues act as damping on the brushhead, which brings the characteristic curves of the amplitude/frequency response downward and smoothes them, i.e., in the low amplitude direction. Although shifting downward, the resonant spring mass system (i.e., actuator 14), as a function of the non-linear resonance, transitions to a medium amplitude, which is a preferred operating amplitude. As disclosed herein, the damped amplitude refers to the full power amplitude of the electronic toothbrush at the operating frequency 72, sufficient for delivering a desired cleaning efficacy according to the embodiments of the present disclosure. In other words, as shown, the characteristic curves for full power amplitude after the shift $78_S$ and full power current after the shift $80_S$ occur in response to the shift in-mouth state. In the damped state, these characteristic curves transition to the curves for damped amplitude $78_D$ and damped current $80_D$, respectively, as illustrated in FIG. 10, each with a respective value at the operating frequency 72.

Figure 11:
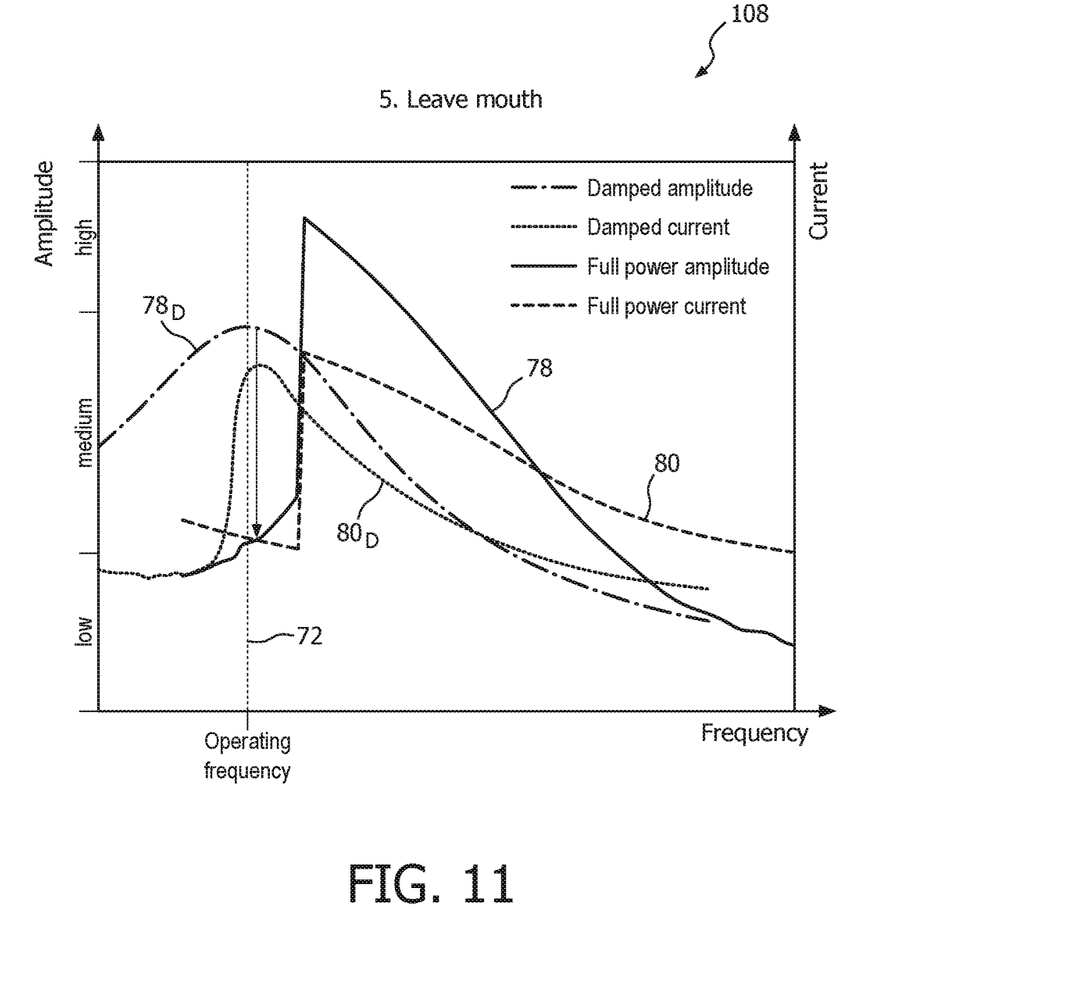

With reference now to FIG. 11, characteristic curves for a leave mouth state 108 are illustrated. The leave mouth state 108 corresponds with an outside the mouth state. Putting the brushhead 20 outside the mouth removes the in-mouth loading, the additional MOI and damping, and thereby returns the resonant spring mass system (i.e., the actuator 14) back to unloaded. Responsive to the system going from loaded to being unloaded, the resonant spring mass system transitions, as a function of the non-linear resonance, from high amplitude to medium amplitude. In other words, the characteristic curves of the amplitude/frequency response of the resonant spring mass system transitions from damped amplitude $78_D$ and damped current $80_D$ to full power amplitude 78 and full power current 80, respectively, each with a respective value at the operating frequency 72 as shown in FIG. 11. In addition, a big drop in current at the operating frequency 72, i.e., from high to medium, indicates that the brushhead 20 has been moved from inside of mouth to outside of mouth.

Figure 12:
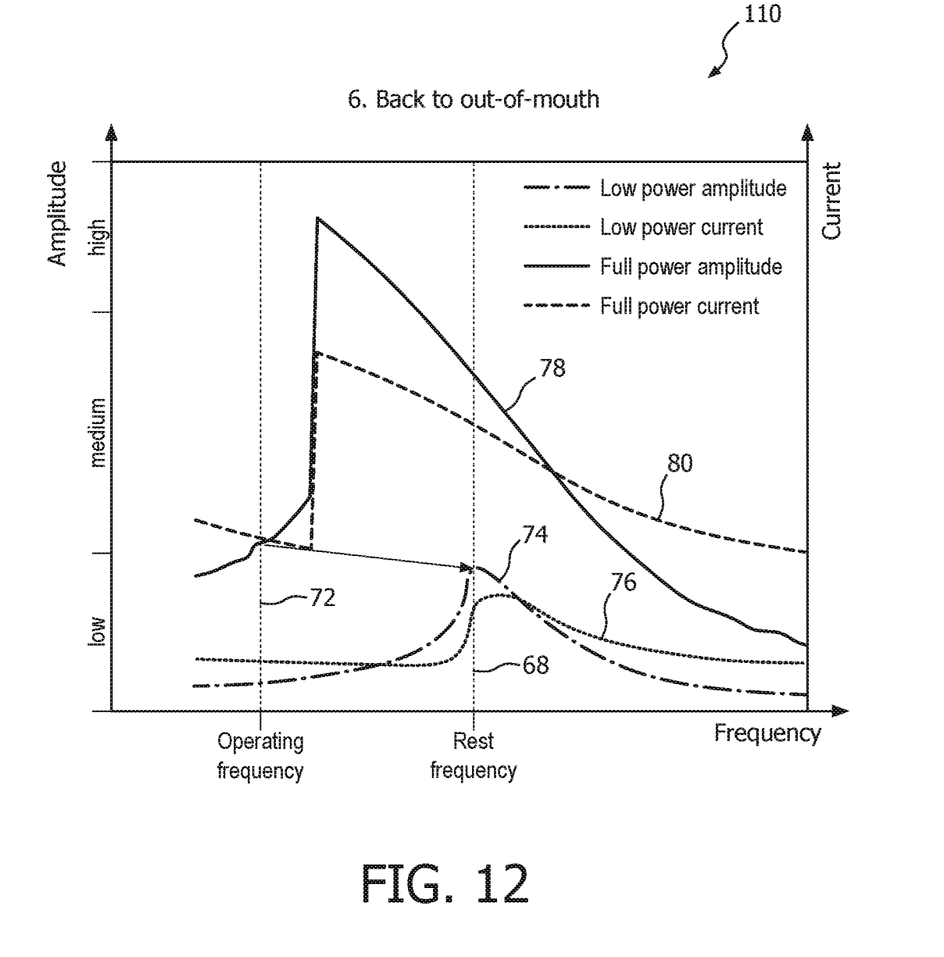

With reference now to FIG. 12, characteristic curves for a return back to out-of-mouth state 110 are illustrated. The return back to out-of-mouth state 110 corresponds with a return back to standby state. In this state, the big drop in current at the operating frequency 72, i.e., a perturbation from high to medium, is detected, thereby indicating that the brush head has been moved outside of the mouth. Responsive to detecting the perturbation, the controller 24 drives the resonant mass spring system (i.e., actuator 14) from the operating frequency 72 with full drive power to the rest frequency 68 with low drive power. Further responsive to driving the system at the rest frequency 68 with low drive power, the resonant spring mass system transitions from medium amplitude to low amplitude. In other words, as illustrated in FIG. 12, the full power amplitude 78 and full power current 80, each with a respective value at the operating frequency 72, transition, in response to the drive signal output via the controller, to the low power amplitude 74 and low power current 76, each with a respective value at the rest frequency 68.

With reference still to FIG. 12, it is noted that the rest frequency 68 is illustrated as being greater than the operating frequency 72. However, in other embodiments, the rest frequency could be less than the operating frequency or the rest frequency could be equal to the operating frequency, according to the requirements of a given personal care appliance implementation.

As understood from the disclosure herein, while operating unloaded, the value of drive current is quite stable. However, for an electronic toothbrush, upon putting the brushhead inside of the mouth, the resonant mass spring system's characteristic current curves will shift and/or deform. The perturbation due to initial contact with mouth can be easily detected in current because the rest frequency drives the system where the highest current sensitivity occurs. Responsive to detecting the perturbation, the controller drives the resonant mass spring system from the rest frequency with low drive power to the operating frequency with full drive power. Further responsive to driving the system at the operating frequency with full drive power, the resonant spring mass system transitions from low amplitude to medium amplitude. Further loading in-mouth and increase in MOI results in the actuator shifting by itself, as a function of the non-linear response characteristics of the actuator, from medium amplitude to high amplitude. This is followed by damping, while still maintaining sufficient amplitude at the operating frequency to deliver a desired cleaning efficacy. Subsequent to leaving the mouth and the detecting of a big drop in current, i.e., a perturbation from high to medium, the controller drives the resonant mass spring system from the operating frequency with full drive power to the rest frequency with low drive power. Further responsive to driving the system at the rest frequency with low drive power, the resonant spring mass system transitions from medium amplitude to low amplitude.

Although only a few exemplary embodiments have been described in detail above, those skilled in the art will readily appreciate that many modifications are possible in the exemplary embodiments without materially departing from the novel teachings and advantages of the embodiments of the present disclosure. For example, while the embodiments discussed herein have related to an electric toothbrush to reduce the amplitude out-of-mouth relative to that in-mouth, the embodiments of the present disclosure can be advantageously used in personal care applications other than power toothbrush applications, in which the other applications create a difference in unloaded versus loaded amplitude by making use of the non-linear response characteristics of a resonant system. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. A personal care appliance operable with self-adaptive amplitude regulation among a plurality of different characteristic load states, the appliance comprising:
    an actuator having a movable shaft configured for resonant movement in response to a drive signal and for being coupled with a workpiece, the actuator further being operable according to a non-linear response characteristic of movement amplitude versus frequency;
    a current sensor for monitoring a driving current; and
    a controller, coupled to the actuator via the current sensor, wherein the controller (i) detects at least one of the plurality of different characteristic load states in response to a perturbation in the monitored driving current and (ii) actively delivers the drive signal to the actuator selected from at least two different drive signals as a function of a detected characteristic load state of the plurality of different characteristic load states for implementing self-adaptive amplitude regulation of the movable shaft's resonant movement among the plurality of different characteristic load states that include one or more additional loads of force, spring, mass, and damping to a given load state of a resonant spring mass system of the actuator coupled with the workpiece;

wherein the plurality of different characteristic load states includes an out-of-mouth state, an initial contact with mouth state, a shift in-mouth state, a damped in-mouth state, and a leave mouth state;

wherein, in response to a detection of a characteristic load state corresponding to an out-of-mouth state, the controller actively delivers a first drive signal to the actuator at a rest frequency and at a relatively low drive power, and wherein the rest frequency is a frequency at which a highest current sensitivity in the response characteristic of the actuator occurs;

wherein, in response to a detection of a characteristic load state corresponding to another of the plurality of characteristic load states, the controller actively delivers a second drive signal to the actuator at an operating frequency and at a relatively high drive power;

wherein, during the initial contact with mouth state, the controller drives the actuator from the rest frequency to the operating frequency;

wherein, during the shift in-mouth state, an amplitude of the moveable shaft's resonant movement autonomously increases to full power amplitude at the operating frequency of the second drive signal via use of non-linear response characteristics of the actuator;

wherein, during the damped in-mouth state, the controller drives the actuator to transition to a damped amplitude at the operating frequency; and wherein, during the leave mouth state, the controller actively delivers the first drive signal to the actuator in response to a return detection of the characteristic load state corresponding to the out-of-mouth state and the frequency of the actuator returns to the rest frequency.

2. The appliance of claim 1, wherein the resonant movement comprises at least one of a rotational resonant movement and a translational resonant movement.

3. The appliance of claim 2, further wherein the rotational resonant movement includes (i) a first rotational angular amplitude in a range of 4 degrees or less and (ii) a second rotational angular amplitude in a range of 8 to 12 degrees.

4. The appliance of claim 1, wherein each drive signal comprises a square wave having a frequency and a duty cycle.

5. The appliance of claim 1, wherein the frequency of the first drive signal includes the rest frequency and the frequency of the second drive signal includes the operating frequency, and wherein the rest frequency is different from the operating frequency.

6. The appliance of claim 1, wherein the personal care appliance comprises a power toothbrush, and wherein the workpiece comprises a brushhead with bristles.

7. A method of self-adaptive amplitude regulation among a plurality of different characteristic load states with a personal care appliance, the method comprising:

providing an actuator having a movable shaft configured for resonant movement in response to a drive signal and for being coupled with a workpiece, further being operable according to a non-linear response characteristic of movement amplitude versus frequency, wherein the resonant movement comprises at least one of a rotational resonant movement and a translational resonant movement;

monitoring, via a current sensor, a driving current of the drive signal to the actuator;

detecting, via a controller coupled to the actuator and the current sensor, at least one of the plurality of different characteristic load states in response to a perturbation in the monitored driving current, and wherein the plurality of different characteristic load states includes an out-of-mouth state, an initial contact with mouth state, a shift in-mouth state, a damped in-mouth state, and a leave mouth state; and actively delivering, via the controller, the drive signal to the actuator selected from at least two different drive signals as a function of a detected characteristic load state of the plurality of different characteristic load states for implementing self-adaptive amplitude regulation of the movable shaft's resonant movement among the plurality of different characteristic load states that include one or more additional loads of force, spring, mass, and damping to a given load state of a resonant spring mass system of the actuator coupled with the workpiece;

wherein, in response to a detection of a characteristic load state corresponding to an out-of-mouth state, the controller actively delivers a first drive signal to the actuator at a rest frequency and at a relatively low drive power, and wherein the rest frequency is a frequency at which a highest current sensitivity in the response characteristic of the actuator occurs;

wherein, in response to a detection of a characteristic load state corresponding to another of the plurality of characteristic load states, the controller actively delivers a second drive signal to the actuator at an operating frequency and at a relatively high drive power;

wherein, during the initial contact with mouth state, the controller drives the actuator from the rest frequency to the operating frequency;

wherein, during the shift in-mouth state, an amplitude of the moveable shaft's resonant movement autonomously increases to full power amplitude at the operating frequency of the second drive signal via use of non-linear response characteristics of the actuator;

wherein, during the damped in-mouth state, the controller drives the actuator to transition to a damped amplitude at the operating frequency; and wherein, during the leave mouth state, the controller actively delivers the first drive signal to the actuator in response to a return detection of the characteristic load state corresponding to the out-of-mouth state and the frequency of the actuator returns to the rest frequency.

8. The method of claim 7, wherein the rotational resonant movement includes (i) a first rotational angular amplitude in a range of 4 degrees or less and (ii) a second rotational angular amplitude in a range of 8 to 12 degrees.

9. The method of claim 7, wherein the first drive signal includes a square wave having the rest frequency and a first duty cycle, and the second drive signal includes a square wave having the operating frequency and a second duty cycle, the rest frequency being different from the operating frequency, and the second duty cycle being greater than the first duty cycle.

10. The method of claim 9, wherein the rest frequency comprises a frequency of the actuator where a highest current sensitivity in the response characteristic of the actuator occurs.

11. The method of claim 9, wherein the operating frequency comprises a frequency in the range of 200-300 Hz, suitable for obtaining a desired cleaning efficacy and efficiency with the workpiece.

12. The method of claim 9, wherein the first duty cycle is in a range of 10:90 to 30:70, corresponding to a range of 10-30 percent ON and a range of 90-70 percent OFF, respectively, for each of a positive polarity portion and a negative polarity portion of the first drive signal, and the second duty cycle is in a range of 90:10 to 70:30, corresponding to a range of 90-70 percent ON and a range of 10-30 percent OFF, respectively, for each of a positive polarity portion and a negative polarity portion of the second drive signal.

* * * * *